United States Patent [19]

Moring

[11] 4,092,772
[45] June 6, 1978

[54] METHOD FOR MAKING A UNIVERSAL JOINT
[75] Inventor: Rodger L. Moring, Yorkville, Ill.
[73] Assignee: Caterpillar Tractor Co., Peoria, Ill.
[21] Appl. No.: 645,149
[22] Filed: Dec. 30, 1975

Related U.S. Application Data
[62] Division of Ser. No. 462,379, Apr. 19, 1974, Pat. No. 3,958,431.

[51] Int. Cl.² .............................................. B23P 19/00
[52] U.S. Cl. ............................................ 29/434; 29/445; 29/463
[58] Field of Search .......................... 29/434, 445, 463; 64/17 A

[56] References Cited
U.S. PATENT DOCUMENTS

| | | | |
|---|---|---|---|
| 1,808,442 | 6/1931 | Weide | 29/445 UX |
| 1,948,176 | 2/1934 | Hopkins et al. | 29/445 X |
| 2,380,628 | 7/1945 | Zempel | 29/445 |
| 2,560,413 | 7/1951 | Carlson | 29/445 UX |
| 3,481,159 | 12/1969 | Kayser | 64/17 A |

Primary Examiner—Charlie T. Moon
Attorney, Agent, or Firm—Phillips, Moore, Weissenberger, Lempio & Majestic

[57] ABSTRACT

A method is disclosed for forming a method is disclosed for joint which comprises a pair of yoke assemblies universally connected by a journal cross having each of its journals rotatably mounted in a cylindrical bearing race. The bearing race is closely fitted within a like-shaped bore preformed between an end cap and a respective support arm of one of the yoke assemblies. The end cap and support arm abut at substantial bearing surfaces thereof disposed on either side of the bearing race.

3 Claims, 3 Drawing Figures

METHOD FOR MAKING A UNIVERSAL JOINT

This is a division, of Ser. No. 462,379, filed Apr. 19, 1974, now U.S. Pat. No. 3,958,431.

BACKGROUND OF THE INVENTION

A conventional universal joint normally comprises a pair of one piece yokes having a cylindrical bearing journal press-fitted or otherwise suitably secured into each arm thereof. The assembly of such a construction requires special tooling and is made difficult since the journal cross must be prepositioned prior to installation of the bearing journals. Such problem has been somewhat alleviated by the advent of universal joints utilizing an end cap for releasably attaching each such bearing journal to a support arm of a yoke assembly. However, the premachined yoke assemblies and end caps are normally mis-matched and do not draw tightly together, giving rise to torque transmission problems.

SUMMARY OF THE INVENTION

An object of this invention is to overcome the above, briefly described problems by providing a method for expeditiously making an efficient, non-complex and economical universal joint. The formed universal joint comprises a pair of yoke assemblies each having a pair of spaced support arms universally connected to each other by four cylindrical journals of a journal cross. Each of the journals is rotatably mounted on a respective one of the support arms by mounting means comprising an end cap releasably attached to the support arm at abutting bearing surfaces thereof and a cylindrical bearing race closely fitted within a bore formed between the end cap and the support arm. The bore is pre-machined while the end cap and support are attached together to assure a substantially uniform torque transmission therebetween during universal joint operation.

BRIEF DESCRIPTION OF THE DRAWINGS

Other objects of this invention will become apparent from the following description and accompanying drawings wherein.

DETAILED DESCRIPTION

Figure 1:
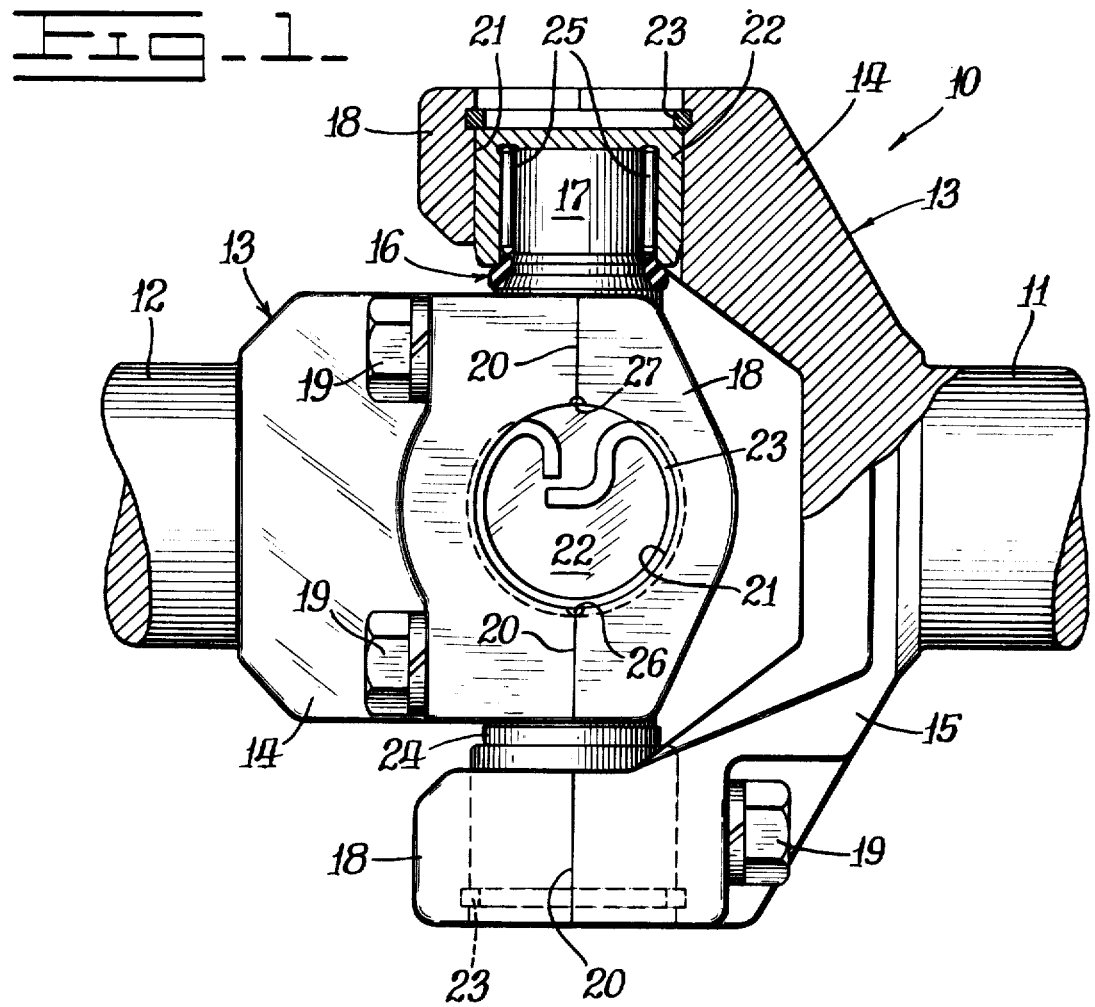
FIG. 1 is a partially sectioned, side elevational view of a universal joint embodying this invention.

FIG. 1 illustrates a universal joint 10 connecting an input shaft 11 to an output shaft 12. The universal joint comprises a pair of substantially identical yoke assemblies 13, each having a pair of spaced support arms 14 and 15 universally interconnected by a journal cross 16. The journal cross has four cylndrical journals 17 (one shown) extending radially outwardly therefrom with each pair of circumferentially adjacent journals being disposed in perpendicular relationship relative to each other.

Mounting means for rotatably mounting each journal 17 on a respective support arm 14 or 15 comprises an end cap 18 releasably attached on the support arm by a pair of cap screws 19. The end cap abuts the support arm at substantial flat bearing surfaces 20 disposed on either side of journal 17. A substantially uninterrupted cylindrical bore 21, intersecting abutting bearing surfaces 20, is defined between the end cap and support arm to retain a closely fitted cylindrical bearing race 22 therein.

The closed end of the cup-shaped bearing race is engaged by a snap ring 23 whereas the opposite, open end thereof is engaged by a ring seal 24 for lubricant seaing purposes. Journal 17 is mounted for limited rotation in the bearing race by a plurality of circumferentially disposed needle bearings 25.

During the manufacture of the universal joint, flat bearing surfaces are preferably pre-machined on precast end caps 18 which are then each attached to a respective yoke assembly 13 by cap screws 19. Bores 21 are then suitably machined to intersect such bearing surfaces and to substantially conform to the outside diameter of cylindrical bearing race 22. If so desired, elongated reliefs 26 and 27 may be formed at the inner ends of bearing surfaces 20 to allow for a slight mismatch or centerline shift between the yoke and the cap to thereby facilitate the machining of a substantially perfect bore 21. Upon completion of such machining, the end caps are removed and the structures are reassembled to their FIG. 1 operational condition.

Figure 2:
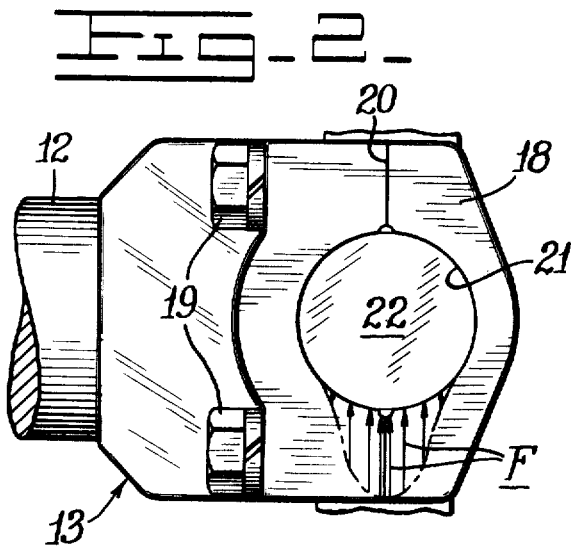
FIG. 2 is a reduced and partial view of the universal joint having arrows superimposed thereon to depict torque transmission forces occurring during operation thereof.

Referring to FIG. 2, the closely attached fit between the outer surface of bearing race 22 and the cylindrical surface defining bore 21, as well as the substantial bearing surface contact 20 between the end cap and the support arm, will function to uniformly and efficiently transmit torque therebetween, as depicted by force arrows F. In contrast thereto, FIG. 3 illustrates a prior art universal joint wherein corresponding force arrows F' are shown in a non-uniform dispersion.

Figure 3:
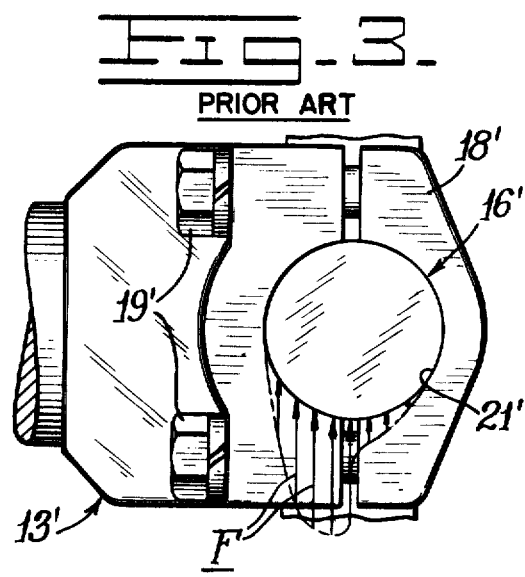
FIG. 3 is a view similar to FIG. 2, but illustrating a prior art universal joint construction and torque transmission forces occurring during operation thereof.

The illustrated mismatch in FIG. 3, between an end cap 18' and a yoke assembly 13', will tend to cause a journal of a journal cross 16' to "roll-out" of contact with respect to an interrupted bore 21' of yoke assembly 13' to thus apply a twisting force on cap screws 19'. Thus, the magnitude of the torque transferred in the FIG. 3 universal joint is substantially less than that transferred by the universal joint of this invention.

I claim:

1. A method for making a universal joint comprising the steps of
    attaching an end cap to each support arm of a pair of yoke assemblies, at abutting bearing surfaces thereof,
    machining and forming a cylindrical bore between each said end cap and support arm so that said bore intersects said bearing surfaces,
    detaching a said end cap from each said support arm,
    mounting a cylindrical bearing race on each journal of a journal cross,
    closely fitting said cylindrical bearing race within each bore to maintain intimate bearing contact therebetween and
    reattaching a said end cap to each support arm to retain a respective bearing race and journal thereon.

2. The method of claim 1 further comprising the step of machining said bearing surfaces flat, prior to the step of attaching said end cap to each support arm.

3. The method of claim 1 further comprising the step of forming a relief at each radially inner edge of each of said bearing surfaces and extending said relief the entire axial length of a respective bore.

* * * * *